United States Patent [19]

Schad

[11] Patent Number: 5,145,630
[45] Date of Patent: Sep. 8, 1992

[54] DIRECT GATING INTO THE LIP OF THIN WALLED CONTAINER

[75] Inventor: Robert D. Schad, Toronto, Canada

[73] Assignee: Husky Injection Molding Systems Ltd., Bolton, Canada

[21] Appl. No.: 662,729

[22] Filed: Mar. 1, 1991

Related U.S. Application Data

[63] Continuation of Ser. No. 221,026, Jul. 18, 1988, abandoned.

[51] Int. Cl.$^5$ .................. B29C 45/22; B29C 45/36; B29C 45/43
[52] U.S. Cl. .................. 264/328.8; 264/328.12; 264/335; 425/556; 425/570; 425/573; 425/577; 425/437; 425/438
[58] Field of Search ............. 264/328.8, 328.9, 328.12, 264/328.16, 335; 425/548, 549, 552, 554, 556, 570, 571, 573, 577, 437, 438

[56] References Cited

U.S. PATENT DOCUMENTS

| | | | |
|---|---|---|---|
| 2,799,435 | 7/1957 | Abplanalp | 264/328.9 |
| 3,660,002 | 5/1972 | Morroni | 425/437 |
| 3,671,159 | 6/1972 | Greenberg . | |
| 3,978,186 | 8/1976 | Lovejoy | 264/328.8 |
| 4,126,291 | 11/1978 | Gilbert et al. | 425/577 |
| 4,277,435 | 7/1981 | Allen . | |
| 4,381,275 | 4/1983 | Sorensen | 264/328.8 |
| 4,382,522 | 5/1983 | Shimazu et al. | 264/328.9 |
| 4,622,002 | 11/1986 | Bormuth | 425/577 |
| 4,721,452 | 1/1988 | Delfer, III | 425/556 |
| 4,726,925 | 2/1988 | Binder . | |
| 4,743,420 | 5/1988 | Dutt . | |
| 4,764,103 | 8/1988 | Mitake | 425/577 |

FOREIGN PATENT DOCUMENTS

| | | |
|---|---|---|
| 124951 | 11/1984 | European Pat. Off. . |
| 315586 | 5/1989 | European Pat. Off. . |
| 756995 | 9/1952 | Fed. Rep. of Germany ...... 264/335 |
| 1259089 | 1/1968 | Fed. Rep. of Germany . |
| 1779104 | 8/1971 | Fed. Rep. of Germany . |

OTHER PUBLICATIONS

Rosato, editor, *Injection Molding Handbook*, 1986, pp. 186–189.

Primary Examiner—Jill L. Heitbrink
Attorney, Agent, or Firm—Bachman & LaPointe

[57] ABSTRACT

A process and apparatus for injection molding thin-walled plastic articles having comparatively thick lip portion. The apparatus has a mold cavity and a mold core defining a cavity space in the shape of the article and at least one injection gate adjacent a portion of the cavity space defining the lip portion through which molded plastic is injected into the cavity space. The direct lip gating approaches employed in the apparatus do not sacrifice core/cavity alignment and conventional mold motions along the machine axis and form plastic articles having substantially no gate vestiges on the lip sealing surface or on the outer perimeter of the lip.

3 Claims, 5 Drawing Sheets

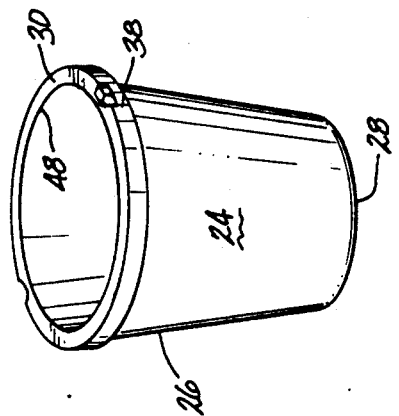
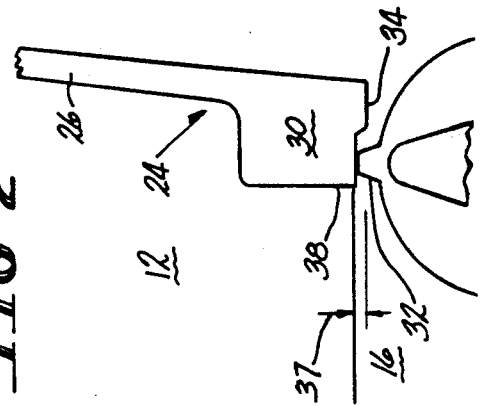
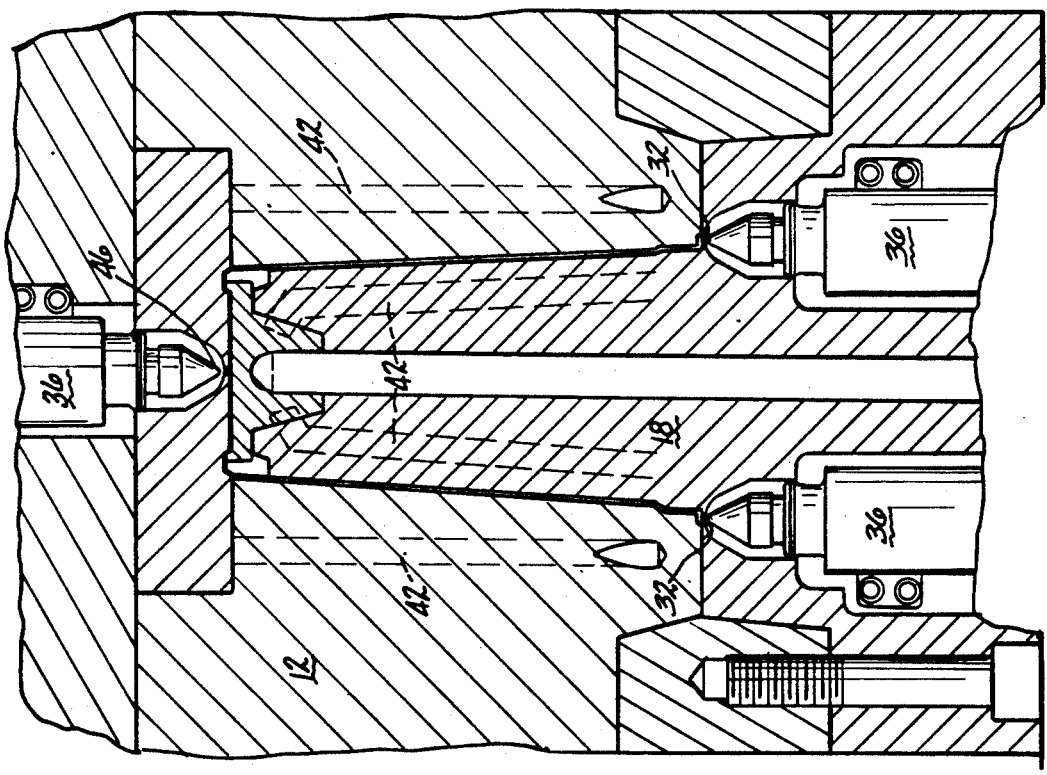

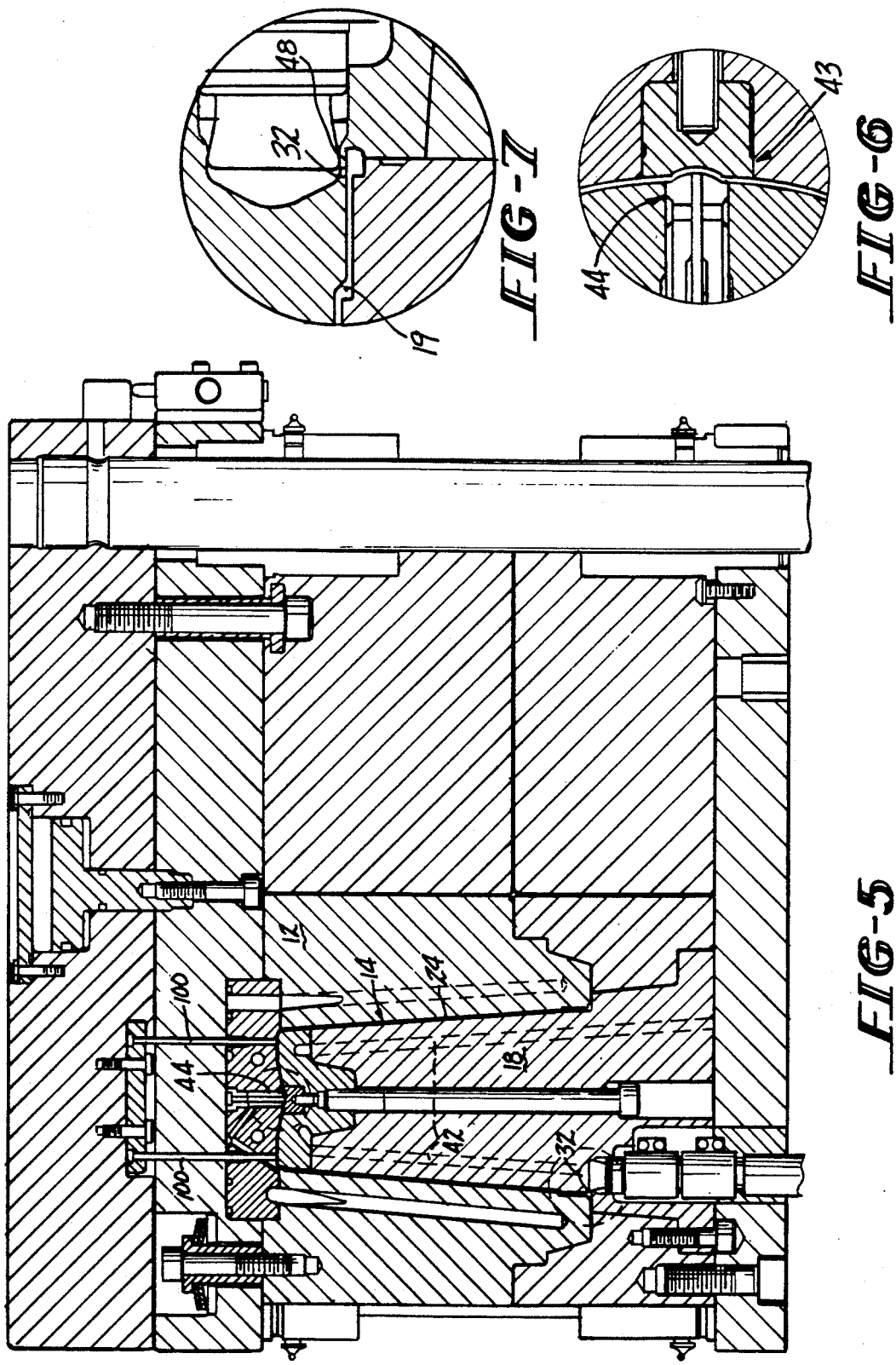

DIRECT GATING INTO THE LIP OF THIN WALLED CONTAINER

This is a continuation, of application Ser. No. 221,026 filed Jul. 18, 1988, now abandoned.

BACKGROUND OF THE INVENTION

The present invention relates to a process and apparatus for molding thin walled containers with comparatively thick lips such as heat sealable food containers, vending cups and beverage tumblers.

Molded articles such as thin walled containers having comparatively thick lips or rims have traditionally been produced by injection molding, usually with a hot runner mold directly gated into the bottom of the container. Limitations on molding cycle and minimizing the sidewall thickness are imposed by the thickness and configuration of the article's lip. In some container styles the lip is considerably thicker than the side wall, typically a lip of 0.030–0.040" compared to a sidewall thickness of 0.015–0.020". It becomes increasingly difficult to properly pack the lip and to eliminate sink mars, when the resin must be forced through the restriction of a very thin sidewall from the gate at the bottom of the part. Generally, the resin must be raised higher in temperature to promote flow through this thin section. The consequences of doing this are that the molding cycle is slowed by the time taken to cool the thickest part of the container - the lip.

Injection blow molding is one approach which successfully overcomes most of the problems with a thick lip/thin sidewall configuration. U.S. Pat. No. 4,540,543 to Thomas shows a typical injection blow system for molding thin wall containers. However, this method requires specialized molds and expensive support equipment.

One problem which does remain however is the tendency to create a mold separation force when injecting the resin into the bottom of the part. This occurs because the top of the mold core acts as a post. As the resin flows under pressure against the top of the mold core, the mold core is pushed away from the mold cavity. The mold separation force thus created can be quite large because the relative cross section mold area at the bottom of the part is relatively large.

Another method for forming molded articles having comparatively thick lip portions is shown in U.S. Pat. No. 4,622,002 to Bormuth. A split cavity mold is shown with an edge gating system feeding directly into the lip of the part. The primary disadvantage of this arrangement is that the alignment of the cavity halves with the core will not adequately resist the considerable side load induced by the injection of the resin at the lip. This side force will cause the mold core to shift out of axial alignment with the mold cavity before the resin has filled the cavity. This in turn will result in a part having an unequal sidewall thickness. A second disadvantage is that the mold must contain complicated mechanisms to synchronize the opening and closing of the cavity halves during the cycle and the runner system must be arranged so the runner axis is perpendicular to the core, and the axis of the machine. This entails additional complexity and expense. A third disadvantage is the formation of gate vestiges on the outer perimeter of the lip.

Accordingly, it is an object of the present invention to provide a process and apparatus for injection molding thin-walled plastic articles with a comparatively thick lip portion.

It is a further object of the present invention to provide a process and apparatus as above which accomplishes direct lip gating without sacrificing core/cavity alignment and conventional mold motions along the machine axis.

It is yet another object of the present invention to provide a process and apparatus as above which forms a thin-walled plastic container having a comparatively thick lip portion with substantially no gate vestiges on the lip sealing surface or on the outer perimeter of the These and other objects and advantages will become more apparent from the following description wherein like reference numerals depict like elements.

SUMMARY OF THE INVENTION

In accordance with the present invention, it has now been found that the foregoing objects and advantages are obtained. The process and the apparatus of the present invention are for injection molding hollow, thin-walled plastic articles such as containers having comparatively thick lip portions. The apparatus of the present invention comprises an injection mold having a first mold half including mold walls defining a mold cavity and a second mold half comprising a mold core which in a closed position is centered within the mold cavity and which defines a cavity space in the shape of the plastic article with the mold cavity. The apparatus further includes means for injecting a flowable plastic material into the cavity space without substantially any side load so that the mold core remains substantially centered within the mold cavity. Maintaining the mold core substantially centered within the mold cavity results in the formation of articles having substantially equal side wall thicknesses.

The injecting means comprises one, two or more gates adjacent the lip portion of the cavity space through which the molten plastic is introduced into the cavity space. This gating approach has been found to be quite desirable because it greatly improves the core shift characteristics of the mold. By filling the comparatively thick lip or rim portion first and then having the plastic material flow through the sidewall portions, substantially equal forces act against the sides of the core and the cavity. This significantly reduces the risk of core shift. In a most preferred embodiment, the injecting means comprises an inside edge gate construction comprising two gates spaced 180 degrees apart both feeding the cavity space from the inside. Inside edge gating is desirable because there are no gate vestiges on the lip sealing surface or on the outer perimeter of the lip.

The process of the present invention comprises providing an injection mold comprising a first mold half having a plurality of walls defining a mold cavity and a second mold half comprising a mold core; moving said mold core into a position where it is centered within the mold cavity and defines with the mold cavity a cavity space in the shape of said plastic article; injecting a flowable plastic material into said space without creating any significant side load whereby said mold core remains substantially centered within said mold cavity and said molded plastic article has sidewalls with substantially identical thicknesses; and said injecting step comprising providing at least one gate through which said plastic material flows adjacent a portion of said space defining said comparatively thick lip or rim portion and initially injecting said plastic material into said space through said at least one gate.

A major advantage of the present invention resides in the ability to accomplish direct lip gating without sacrificing core/cavity alignment and conventional mold motions along the machine axis. Since the core is able to remain substantially centered within the cavity, a part or article can be produced having minimal core shift.

Further advantages and features of the present invention will appear hereinbelow.

BRIEF DESCRIPTION OF THE DRAWINGS

FIG. 2 illustrates an article formed by the apparatus of FIG. 1.

FIG. 3 is an enlarged view of the tip gate/lip interface in FIG. 1.

FIG. 4 illustrates a core/cavity stack arrangement having three hot tip gates for supplying plastic material to the cavity space.

FIG. 5 illustrates a core/cavity stack arrangement having an inside edge gate construction.

FIG. 6 is an enlarged view of the ejection system employed in the core/cavity stack arrangement of FIG. 5.

FIG. 7 is an enlarged view of the gate construction employed in the core/cavity stack arrangement of FIG. 5.

DETAILED DESCRIPTION

Figure 1:
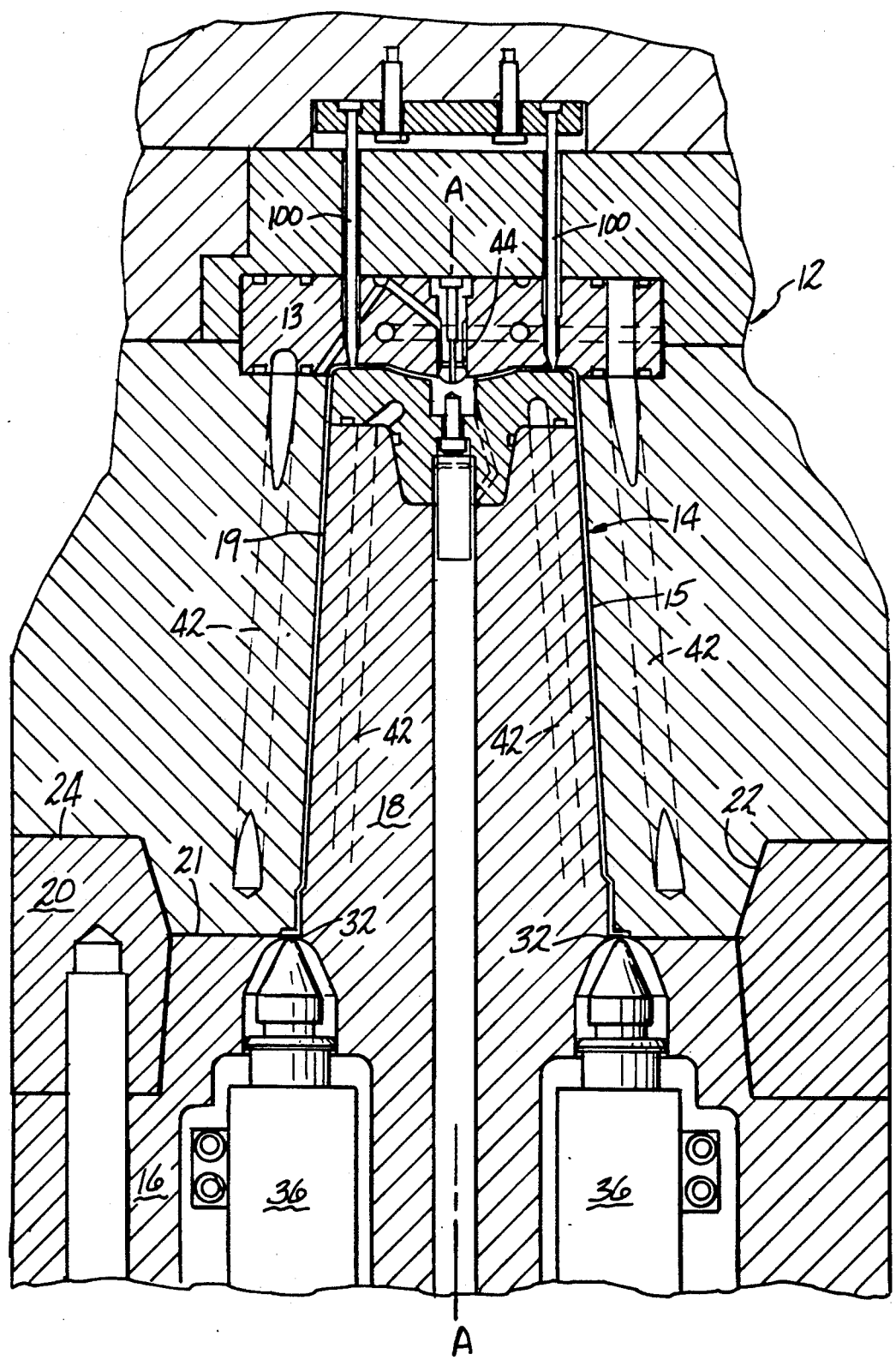
FIG. 1 illustrates a core/cavity stack arrangement where two hot tip gates are located in the core feeding into the lip portion of the cavity space.

Referring now ti FIG. 1, the injection molding apparatus of the present invention comprises a mold stack including mold halves 12 and 16. The first mold half 12 comprises a mold cavity 14 defined by a plurality of walls 15 and a gate pad 13. The second mold half 16 comprises a mold core 18. Suitable means not shown are provided for moving the mold halves 12 and 16 between mold open and mold closed positions. For example, the mold half 12 may be secured to a fixed platen not shown while the mold half 16 may be secured to a movable platen not shown. The stack as shown in FIG. 1 is in a mold closed position. The stack assembly further includes a lock ring 20 and tapers 22 for mechanically aligning the mold halves along the axis A—A. Alignment of the mold halves is important from the standpoint of producing an article 24 having sidewalls 26 with a substantially uniform thickness.

In the mold closed position, the mold core 18 and mold cavity 14 define a cavity space 19 in the shape of the article or part to be formed. FIG. 2 illustrates one type of article which can be formed using the apparatus of FIG. 1. The article 24 has a base portion or bottom 28, sidewalls 26 and a comparatively thick lip or rim portion 30. A typical sidewall thickness for the article 24 is in the range of from about 0.015" to about 0.020" while a typical lip thickness is in the range of from about 0.030" to about 0.040".

As previously discussed, articles such as that shown in FIG. 2 have traditionally been produced by injection molding with a hot runner mold directly gated into the bottom of the container. The primary deficiency of this approach is that it becomes increasingly difficult to properly pack the lip portion and to eliminate sink marks when the plastic material must be forced through the restriction of a very thin sidewall from a gate at the bottom of the part. Direct gating into the lip portion successfully avoids this problem.

As shown in FIG. 1, molten plastic can be directly gated into the lip portion using two gates 32 positioned adjacent a portion of the cavity space defining a sealing surface 34 on the lip 30. As shown in FIG. 3, each gate 32 is preferably positioned as close as possible to the outer edge 38 of the lip so as to maximize the sealing surface 34. In a preferred arrangement, the gates 32 are spaced approximately 180° apart. Each gate 32 communicates with a hot runner nozzle 36 through which molten plastic is supplied. To accommodate the gate vestige after the article 24 is molded, the mold core and cavity can be configured so that the cavity space defines a locally reduced lip thickness 37 adjacent the outer edge portion 38 of the lip. In operation, plastic material is introduced into the lip portion simultaneously through the two gates 32.

Since the plastic is supplied into the relatively thick annular lip area, the plastic will first flow around the lip to encircle the core before the entering and filling the relatively thinner sidewalls. As the plastic advances toward the portion of the cavity space defining the bottom of the article, air becomes trapped in the cavity space. A vent 44 is provided in the gate pad 13 to permit air within the cavity space 19 to escape.

One of the primary advantages attendant to the apparatus of FIG. 1 as well as the other apparatus embodiments is the ability to introduce the plastic material into the cavity space with substantially no side loads. This is because the plastic material flows into and fills the lip portion first before flowing into the sidewalls in a balanced fashion. As a result, the mold core 18 remains substantially centered within the mold cavity 14. The article 24 produced by the apparatus of the present invention has minimal core shift and sidewalls with a substantially uniform thickness. Another advantage is the substantial absence of forces tending to cause mold opening. This is also because the plastic material flows first into the annular, comparatively thick lip portion which has a relatively small area before filling the thin sidewalls and the bottom of the part. This means that initially there is less projected area subjected to injection pressure than there would be if the part was filled conventionally with a gate in the middle of the bottom. The result is less force tending to open the mold while it is filling.

After the plastic material has completely filled the cavity space 19, solidification occurs through cooling of the mold halves. Any suitable means known in the art may be used to cool the mold halves 12 and 16. Preferably, cooling is accomplished by flowing a suitable coolant fluid through cooling channels 42. Since the lip portion is the thickest part of the article and is closest to the gate and therefore the hottest, particular attention is given to providing efficient cooling in the lip portion by placing the cooling channels in the close proximity thereto.

Once the article has solidified on the mold core 18, the mold halves are moved into a mold open position. The article is then ejected in the following manner. One or more vents 44 are provided in the gate pad 13. The vent(s) 44 are connected to a vacuum and/or air source not shown. As the core 18 moves toward the mold open position, a vacuum si pulled through the vent(s) 44 to hold the part in position against the mold cavity. If desired, air may be blown through fixed vents 43 on the core to assist in maintaining the part in position. When the core 18 reaches the full mold open position, the vacuum is stopped and air is caused to flow through the vent(s) 44. The air flow through the vent(s) 44 then blows the part out of the mold cavity. To assist in ejecting the part, one or more moving vents or vent pins 100 communicating with the air source not shown are provided. When the mold has fully opened, the cavity plate is advanced causing the vent pin(s) 100 to be opened to allow a large volume of air to be supplied to the base of the part pushing it out of the cavity. Obviously, the negative air pressure is turned off or reversed at this time.

If desired, the article 24 could be produced by gating from opposite ends. FIG. 4 illustrates a stack arrangement for accomplishing this. In this approach, a gate 46 is positioned adjacent the portion of the cavity space defining the bottom of the article. Suitable vent means not shown are provided to remove air from the cavity space 19. In use, the article 24 is formed by simultaneously introducing plastic material into the cavity space via gates 32 and 46.

Where it is desired to insure that there are not gate vestiges on the lip sealing surface 34 or the outer edge 38 of the lip 30, a gating approach using an inside edge gate arrangement may be used. FIG. 5 illustrates a stack arrangement employing one gate 32 adjacent a portion of the cavity space 19 defining an inner edge 48 of the article to be formed. The gate 32, as shown in FIG. 7, initially injects plastic material into the comparatively thick lip portion adjacent the inner edge 48. The material flows into the sidewalls and to the base after the lip portion has been filled. FIG. 6 illustrates the vent system employed to hold the part in place while the mold opens and to eject the part after the mold has fully opened. The bent system is the same as that employed in the stack arrangement of FIG. 1.

Figure 8:
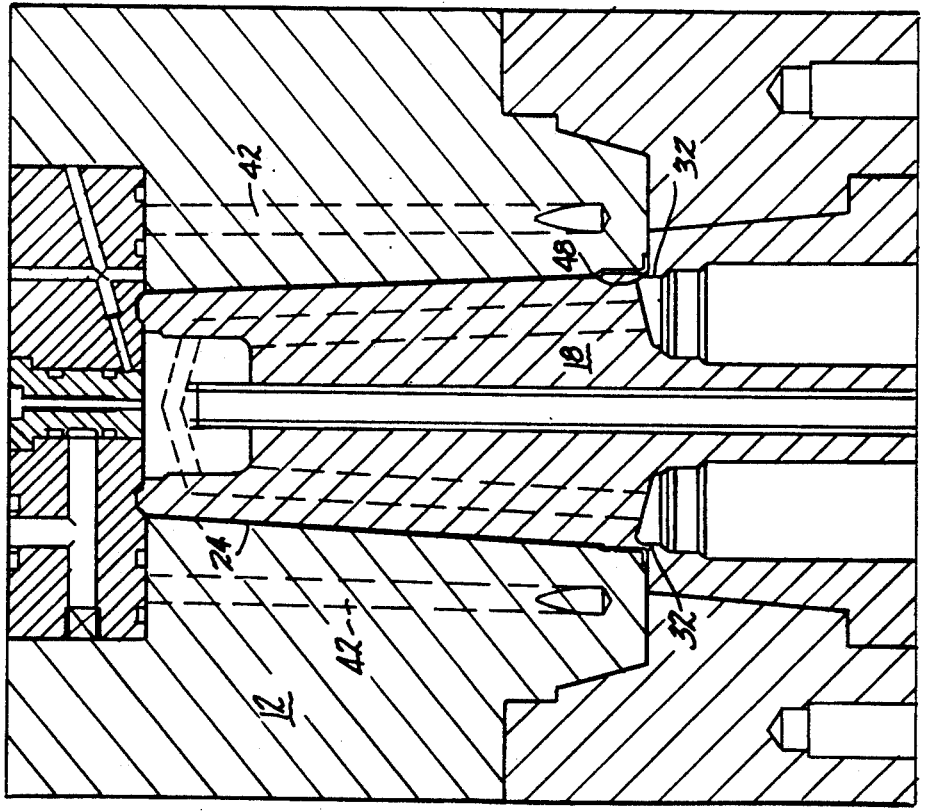
FIG. 8 illustrates a core/cavity stack arrangement having a dual inside edge gate construction.

FIG. 8 illustrates a stack arrangement employing two inside edge gates 32. When using two inside edge gates 32, it is preferred to space them approximately 180° apart. In use, the apparatus of FIG. 8 forms the article 24 by initially introducing the plastic material into the comparatively thick lip portion of the cavity space from both of the inside gates 32.

Figure 9:
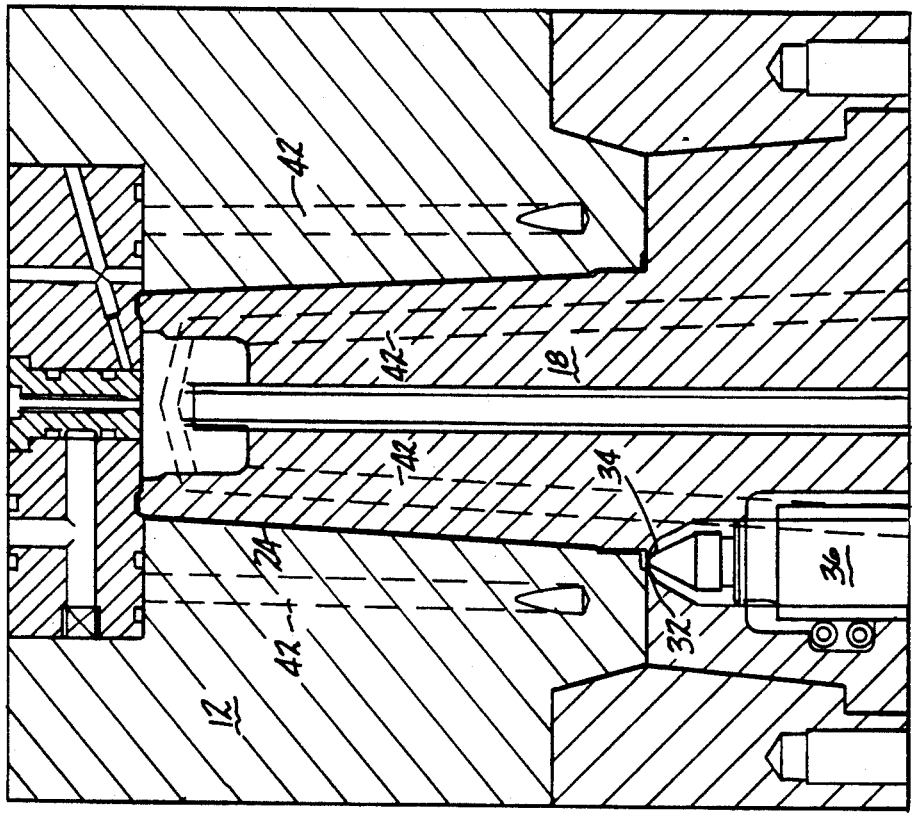
FIGS. 9-11 illustrate core/cavity stack arrangements having various gate configurations for gating into the lip of the article.
Figure 11:
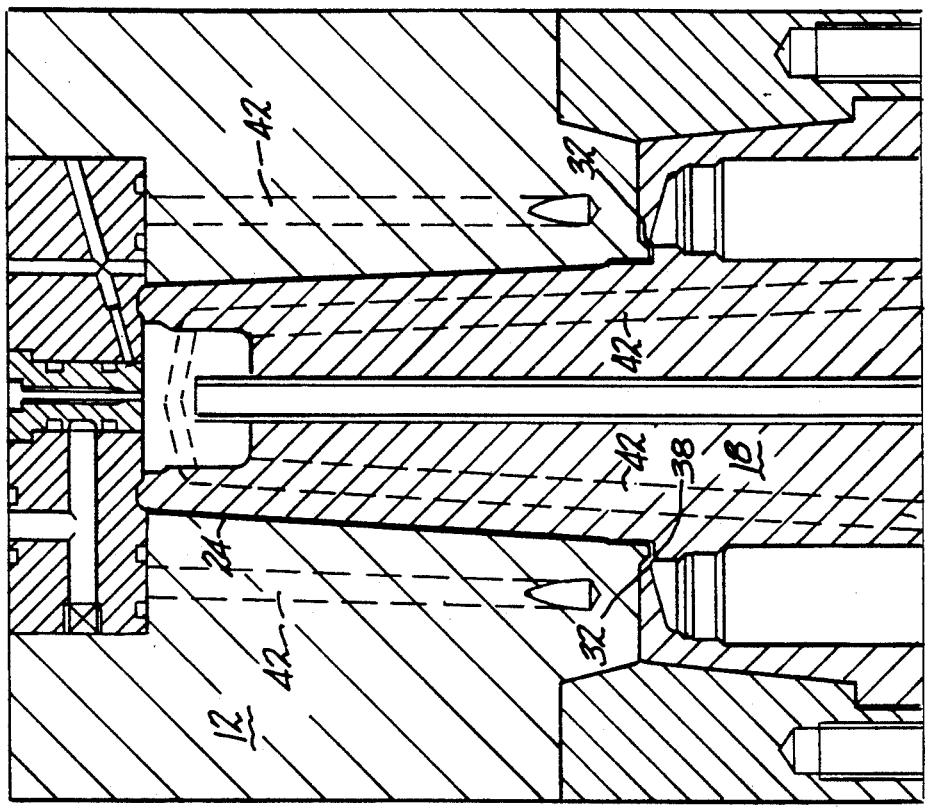
Figure 10:
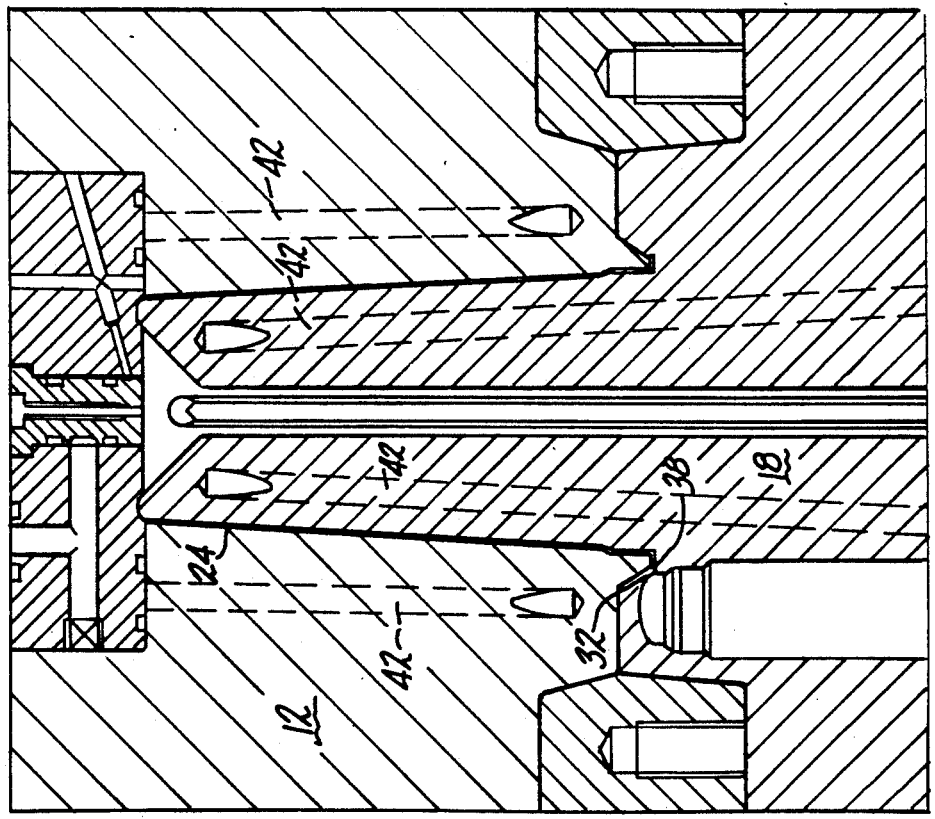

FIGS. 9-11 illustrate other stack arrangements in accordance with the present invention. FIG. 9 illustrates the use of one gate adjacent the portion of the cavity space defining the sealing surface 34. FIG. 10 illustrates the use of one gate adjacent the portion of the cavity space defining the outer edge 38 of the lip 30. FIG. 11 illustrates the use of two gates, spaced approximately 180° apart, adjacent respective portions of the cavity space defining the outer edge 38 of the lip.

While the figures illustrate the use of one or two gates in a variety of gating positions, it should be recognized that more than two gates can be used. For example, more than two interior edge gates can be employed in the stack arrangements of FIG. 1, FIG. 5 and FIG. 9. When more than two gates are used, it is preferred to space the gates substantially equally about the periphery of the cavity space so as to minimize the possibility of introducing a side load.

Articles formed using the apparatus and process of the present invention may be used as heat sealable food containers, vending cups and beverage tumblers.

As can be seen from the foregoing discussion, the direct lip gating approaches illustrated herein improve the core shift characteristics of the mold. Each gating approach initially fills the comparatively thick lip portion before the plastic material flows along the sidewalls. Thereafter, the plastic material flows substantially equally along the sidewalls causing equal forces to be applied to the core and the cavity. As a result, the core remains substantially centered within the mold cavity. The substantial absence of any core shift in turn results in an article having sidewalls with substantially equal thicknesses. The gating approaches used herein also significantly reduce forces tending to cause the mold to open. This is because the cross sectional area over which the forces act, the relatively small annulus area, is significantly reduced.

It is apparent that there has been provided in accordance with this invention, a process and apparatus for direct gating into the lip of a thin-walled container which fully satisfy the objects, means, and advantages set forth hereinbefore. While the invention has been described in combination with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A process for injection molding a thin-walled plastic article with a comparatively thick lip portion which comprises:

providing an injection mold comprising a first mold half having a plurality of walls defining a mold cavity and a second mold half comprising a mold core;

moving said mold core into a position where it is centered within the mold cavity and defines with the mold cavity a cavity space in the shape of said plastic article;

injecting a flowable plastic material into said space without creating any significant side load whereby said mold core remains substantially centered within said mold cavity and said molded plastic article has sidewalls with substantially equal thicknesses;

said injecting step comprising providing at least two gates for injecting plastic material into said space, positioning each said gate adjacent a respective portion of said space defining said thick lip portion, and substantially simultaneously injecting plastic material into said space through said gates;

cooling said mold halves so as to solidify said plastic material in said cavity space into said plastic article;

moving said mold halves into a mold open position;

ejecting said plastic article from said mold core; and said ejecting step comprising providing at least one vent communicating with both a vacuum source and an air source and at least one vent pin communicating with said air source, maintaining said article in a position against the mold cavity by applying a vacuum through said at least one vent as to the mold core moves toward the mold open position, and thereafter blowing air through said at least one vent and said at least one vent pin to eject said article from said mold core.

2. An apparatus for injection molding a thin-walled plastic article with substantially equal thickness sidewalls, a base portion, and a comparatively thick lip portion which comprises:
- a first mold half having a plurality of walls defining a mold cavity;
- a second mold half comprising a mold core, said mold core defining with said mold cavity a cavity space in the shape of said plastic article;
- means for injecting a flowable plastic material into said space without substantially any side load so that said mold core remains substantially centered within said mold cavity;
- said injecting means including at least two gates spaced about a portion of said space defining said lip portion and a hot runner nozzle associated with each gate for supplying said flowable plastic material to the gate;
- said gates simultaneously injecting said plastic material initially into the portion defining said lip portion;
- means for ejecting said molded article from said mold cavity; and
- said ejecting means including at least one vent communicating with both a vacuum source and an air source, said article being held within said mold cavity by the application of negative pressure through said at least one vent by said vacuum source as said mold core moves toward a mold open position and said article being ejected from said mold cavity by blowing air from said air source through said at least one vent when said core reaches said mold open position.

3. An apparatus according to claim 2 wherein said ejecting means further includes at least one vent pin communicating with said air source, whereby said at least one vent pin is opened when said core reaches said mold open position and air flowing through said at least one pin assists in ejecting said article.

* * * * *